United States Patent [19]

Durand et al.

[11] Patent Number: 5,584,366
[45] Date of Patent: Dec. 17, 1996

[54] VANDAL-SAFE SYSTEM FOR FASTENING AN ELECTRICAL COMPONENT ON A SUPPORTING WALL

[75] Inventors: Christophe Durand; Bernard Picquenot, both of Gien, France

[73] Assignee: Otis Elevator Company, Farmington, Conn.

[21] Appl. No.: 492,663

[22] Filed: Jun. 20, 1995

[30] Foreign Application Priority Data

Jul. 7, 1994 [FR] France .................................. 94 08393

[51] Int. Cl.⁶ .................................................. B66B 7/00
[52] U.S. Cl. ........................... 187/414; 187/395; 200/295; 248/27.3
[58] Field of Search ..................... 187/414, 395, 187/397, 399; 200/295, 296; 248/27.1, 27.3

[56] References Cited

U.S. PATENT DOCUMENTS

| | | | |
|---|---|---|---|
| 3,793,563 | 2/1974 | Brefka | 248/27.3 |
| 4,461,938 | 7/1984 | Sorenson | 200/296 |

FOREIGN PATENT DOCUMENTS

| | | |
|---|---|---|
| 167336 | 1/1986 | European Pat. Off. . |
| 220807 | 5/1987 | European Pat. Off. . |
| 75346 | 6/1964 | France . |
| 2903176 | 7/1980 | Germany ............................. 248/27.3 |
| 250288 | 6/1988 | Germany . |
| 346923 | 7/1960 | Switzerland . |
| 2134723 | 8/1984 | United Kingdom . |

*Primary Examiner*—Kenneth Noland

[57] ABSTRACT

The invention comprises an elevator electrical component having a front plate that has no visible fasteners, the component being removable by a key. The elevator component has a housing attached to a face plate, a number of flexible arms attached to and integral with the housing, the arm(s) causing the housing to interfere with an opening in the elevator or the landing upon insertion or removal of the housing from the opening, the arm being movable in two directions to avoid interference with the opening upon insertion or removal of the housing from the opening, a visually inconspicuous accessway in the face plate for allowing access to the arm, and a key for extending through the accessway and simultaneously moving the arm or arms in both directions to allow the component to be removed from the opening without interference by the arm(s). The component may include a shaped projection that causes the housing to be specially manipulated to remove the housing from the opening even after usage of the key. The component may also include an obstruction to prevent the arm or arms from not interfering with the opening unless the key is used.

13 Claims, 3 Drawing Sheets

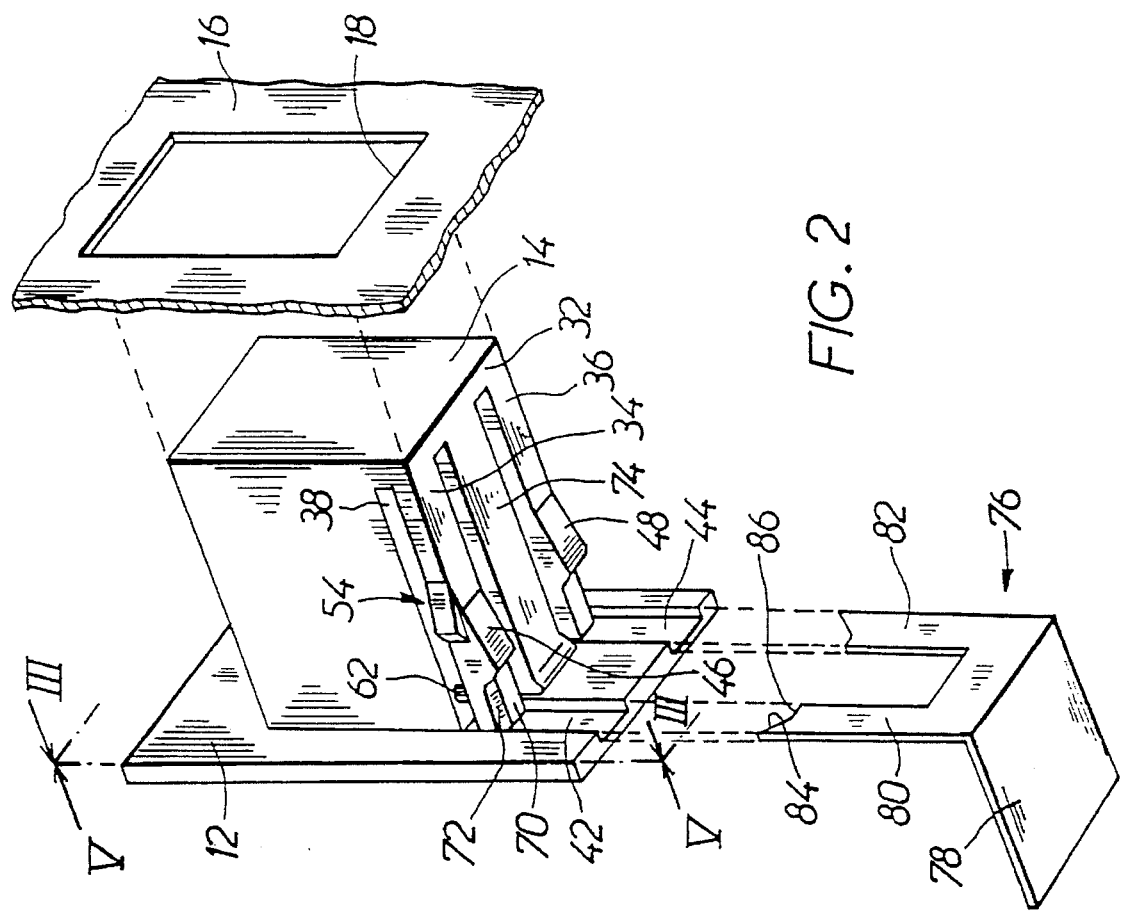
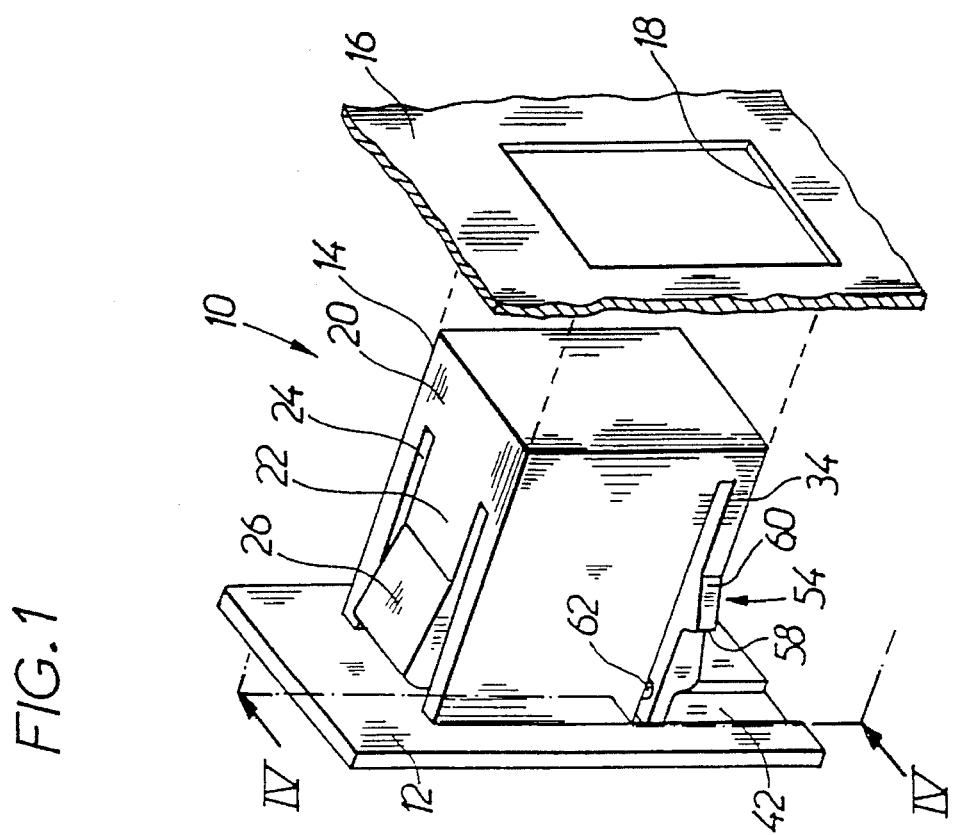

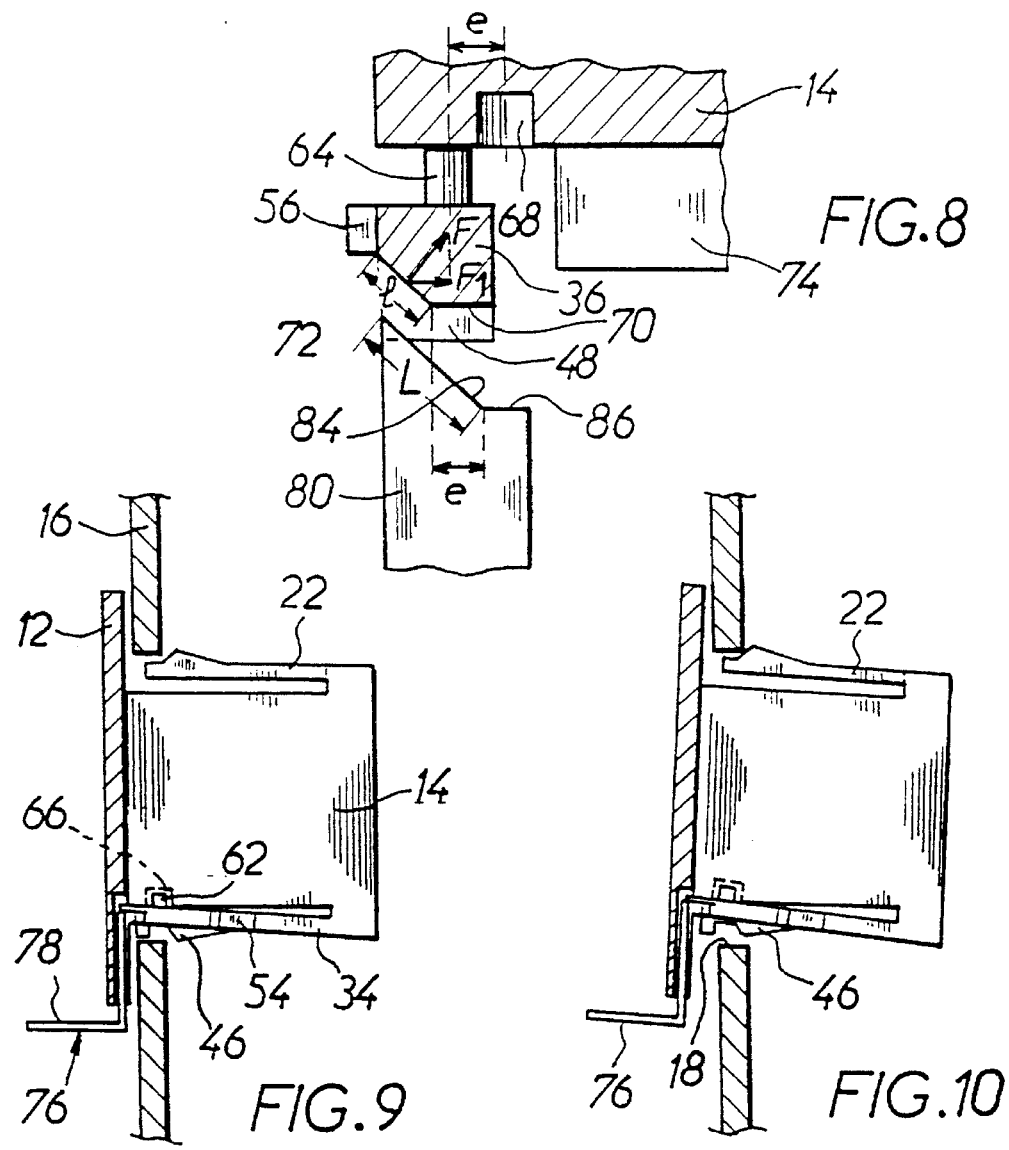
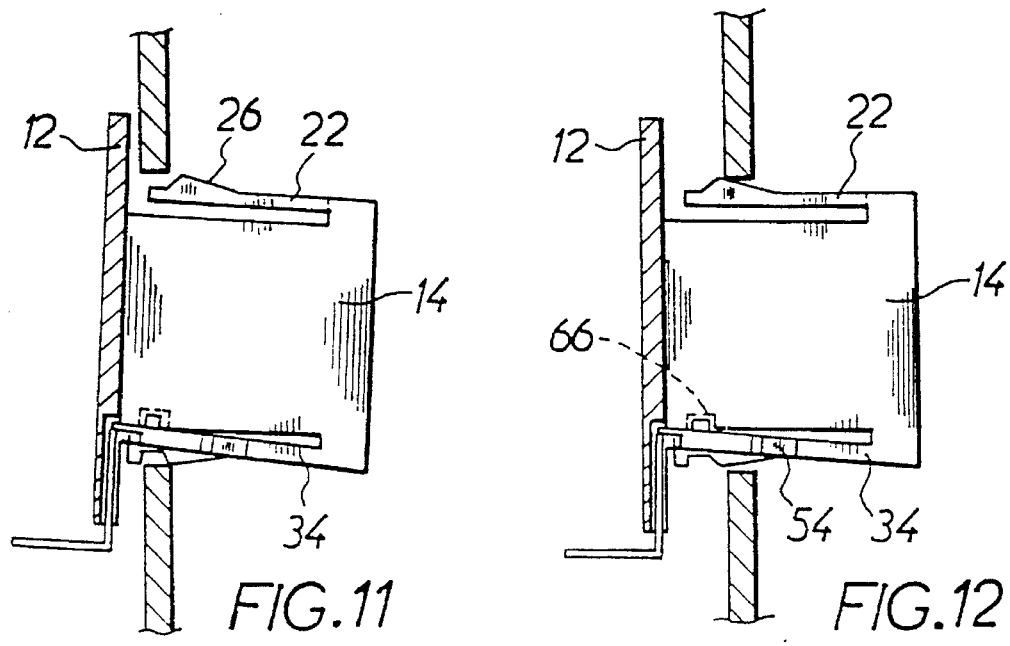

VANDAL-SAFE SYSTEM FOR FASTENING AN ELECTRICAL COMPONENT ON A SUPPORTING WALL

TECHNICAL FIELD

The present invention relates to elevator electrical component and more particularly to an elevator component that is mounted on an elevator supporting wall in such a way that it cannot be dismounted by an unauthorized person.

BACKGROUND OF THE INVENTION

It is known to embed electrical elevator components, such as signaling indicators, photoelectric cells, button box, etc., within orifices in the wall of an elevator car or in the pillars of a landing entrance. The components usually have a from plate on which control buttons or a display screen is disposed, and a housing containing electrical contacts, connectors, etc. The housing is embedded within the orifice and the front plate abuts a supporting wall.

Since access to such components from the rear of the supporting wall is usually impossible, components must be fastened and accessed from the front of the wall. Fasteners used for this purpose, such as screws and nuts, should be theft and vandal proof. But, because such fasteners are visible in the elevator car or at the landing, they may alter the aesthetic appearance of the front plate.

DISCLOSURE OF THE INVENTION

The object of the present invention is to provide an elevator component fastening system which is aesthetically pleasing to users of the elevator.

It is a further object of the invention to allow an easy and quick dismounting of the component from the elevator car or landing.

It is a further object of the invention to provide an elevator component that is theft and vandal resistant.

The invention comprises an elevator component having a front plate that has no visible fasteners and is removed by a key. The component comprises a face plate, a housing attached to the face plate, a flexible arm attached to and integral with the housing, the arm causing the housing to interfere with an opening in the elevator or the landing upon insertion or removal of the housing from the opening, the arm being movable in two directions to avoid interference with the opening upon insertion or removal of the housing from the opening, a visually inconspicuous accessway in the face plate for allowing access to the arm, and a key for extending through the accessway and simultaneously moving the arm in both directions to allow the component to be removed from the opening without interference by the arm.

The component may include another arm being capable of moving in two directions and being moved in two directions by the key at the same time the other arm is moved in two directions by the key.

The component may include a shaped projection that causes the housing to be specially manipulated to remove the housing from the opening even after usage of the key.

The component may include a means to prevent the arm or arms from not interfering with the opening unless the appropriate key is used.

The invention will be more clearly understood from the following description of an embodiment of an electrical component with reference to the attached drawings.

BRIEF DESCRIPTION OF THE DRAWINGS

FIG. 1 is a perspective view of an electrical component seen from above and ready to be fitted into an orifice of a supporting wall;

FIG. 2 is a perspective view of the same component seen from below and showing also a key used to dismount the component;

FIG. 8 is an enlarged view of a detail of FIG. 5;

FIGS. 9 to 12 are schematic vertical views showing successive steps in the dismounting of the component.

BEST MODE FOR CARRYING OUT THE INVENTION

Figure 4:
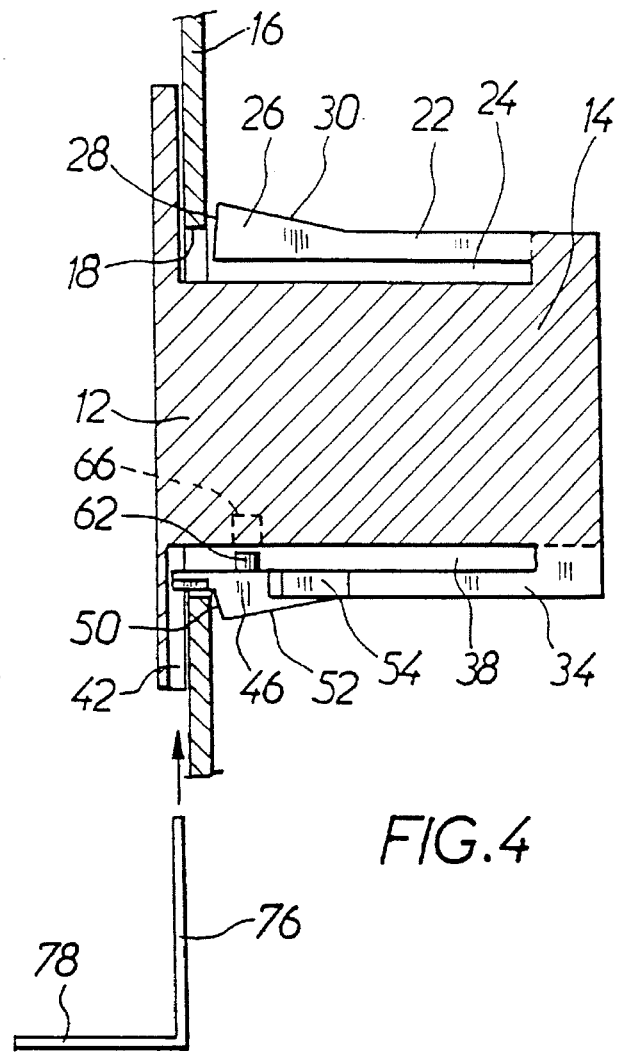
FIG. 4 is a sectional view taken along line IV—IV of FIG. 1.

Referring to FIGS. 1 and 2, an electrical component 10 for an elevator car, such as a signaling indicator, a photoelectric cell, a button box or the like, comprises a front plate 12 having a generally rectangular shape and bearing, on its rear face, a conventionally attached housing 14, having a parallelepipedic or any other shape, the housing containing electrical elements. The housing is attached to the front plate such that such attachment is not visible on its front face. This component is fixed to a wall 16 of the elevator car or to an upright pillar of a landing entrance. The wall or the upright pillar has a rectangular orifice 18 in which the housing 14 is inserted, the front plate 12 abutting against the front face of the wall 16, forming a slight extra thickness as shown in FIG. 4.

In order to keep the component in position inside the orifice 18, there is provided on the upper face 20 of the housing at least one elastic clip 22 in form of an elongated tongue extending along the median plane of the housing. The clip 22 is attached to the housing by its rear end, is received in a recess 24 (FIG. 4) formed on the upper face 20, and can retract within the recess when it is pushed. The free end of the clip 22 arrives at a distance from the rear face of the front plate 12 which is substantially equal to the thickness of the wall 16.

The clip 22 has, on the upper face of its free end, an upper stop 26 having a steep flank 28 inclined frontwards and a low-slope flank 30 inclined rearwards. The stop 26 protrudes with respect to the common plane containing the upper faces of the clip and of the housing.

As shown in FIG. 2, the housing comprises, on its lower face 32, two elastic clips 34, 36 in form of elongated tongues extending along the longitudinal edges of the housing, respectively clips 34, 36 are attached to the housing by their rear ends and are received in recesses 38, 40 (FIG. 5) provided on the lower face of the housing and inside which they can be retracted.

Figure 3:
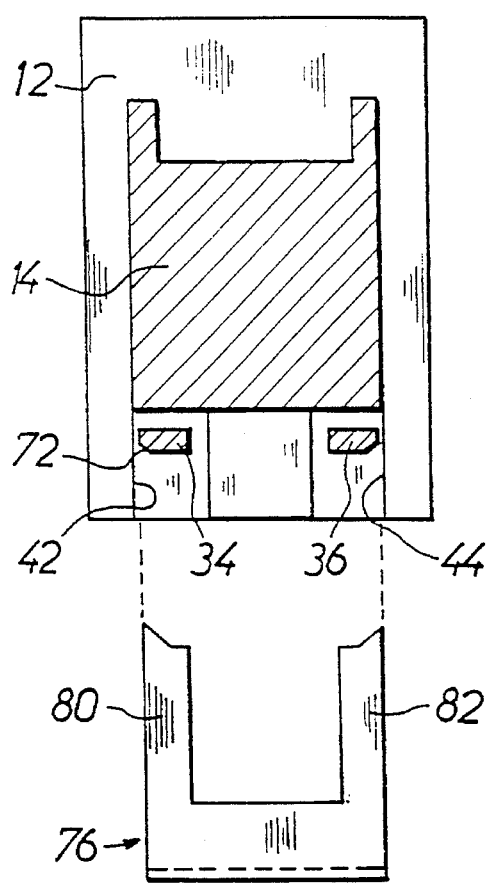
FIG. 3 is a sectional view taken along line III—III of FIG. 2.

As shown in FIG. 4, the free ends of the lower clips 34, 36 protrude inside two vertical grooves 42, 44, respectively, formed on the inner face of the front plate 16, below the housing 14. The width of the grooves is greater than the width of the lower clips at their ends (see FIG. 3) and the ends normally rest against the outer edges of the grooves.

Each lower clip comprises, on its upper face, a lower stop 46, 48 having a steep flank 50 inclined frontwards and a low-slope flank 52 inclined rearwards. As shown in FIG. 4, the steep flank terminates at a distance from the front plate which is substantially equal to the thickness of the wall 16.

Furthermore, each clip 34, 36 comprises, on its outer lateral face, a lateral stop 54, 56 the position of which is offset backwards with respect to the corresponding lower stop 46, 48. The lateral stops have a steep flank 58 inclined frontwards and a low-slope flank 60 inclined rearwards.

On the inner face of the lower clips 34, 36, are formed studs 62, 64 having the same height as the recesses 38, 40. As a result, the clips normally abut against the bottom of the recesses and cannot be directly bent towards the interior of the housing.

Figure 5:
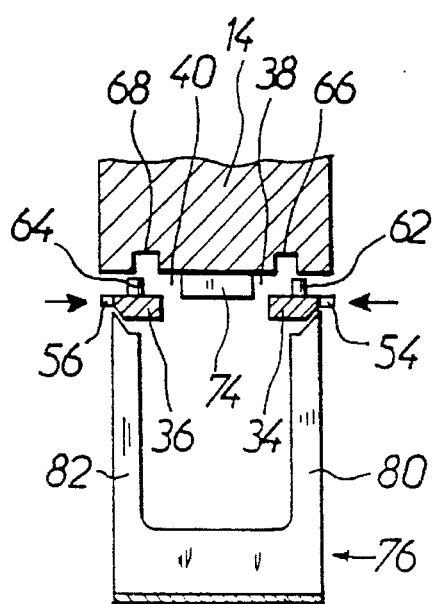
FIGS. 5 to 7 are schematic sectional views taken along line V—V of FIG. 2 and showing three successive steps in the retraction of the lower clips.
Figure 6:
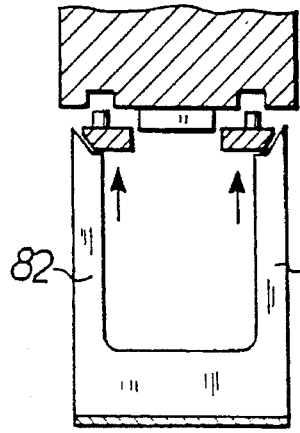
Figure 7:
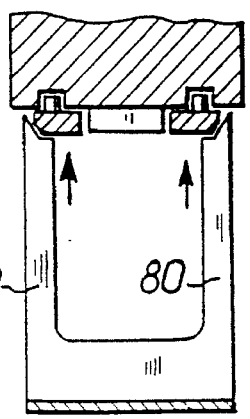

As shown in FIG. 5, in the bottom of the recesses 38, 40, are two blind holes 66, 68 having the same directions as the studs 62, 64. These holes are offset towards the median plane of the housing with respect to the normal position of the studs. Thus, in order to retract clips 34, 36 within recesses 38, 40, they first must be brought closer to one another by exerting lateral forces on them in opposite directions until the studs face the holes 66, 68, and then be pushed in the recesses.

The free end of each clip 34, 36 comprises a flat lower face 70 and a beveled face 72 on its lower external edge.

The housing 14 further comprises, between the lower clips 34, 36, a fixed central stop 74 intended to limit the bending of the clips in the direction where they are approached.

The component is mounted on the wall 16 as follows: the housing 14 is inserted in the orifice 18 and when the low-slope flank 30 of the upper stop 26 reaches the upper edge of the orifice 18, the upper clip 22 is bent downwards and retracts within the upper recess 24. Simultaneously, the low-slope flanks 60 of the lower lateral stops 54, 56 come into contact with the vertical edges of the orifice 18. As the component is pushed further in the orifice, the edges urge the lower clips 34, 36 inwardly until the studs 62, 64 face the holes 66, 68. At this moment, the low-slope flanks 52 of the lower stops 46, 48 come into contact with the lower edge of the orifice, whereby the lower clips retract within the recesses 38, 40. The component is pushed further until the upper stop 26 and the lower stops 46, 48 have completely passed through the orifice. The clips 22, 34, 36 return then resiliently to their initial position and the stops 26, 46, 48 snap behind the wall 16, thus making it impossible to dismount the component. In this position, the front plate 12 is in close contact against the front face of the wall.

Once mounted, the component cannot in any way be dismounted by means of conventional tools, first because the entrances to the grooves 42, 44 are turned downwards and can therefore not be seen by a person standing up. Furthermore, even if somebody discovers the entrances and has the idea to insert two flat and thin rods through the grooves, he will not yet be able to push the lower clips 34, 36, due to the presence of the studs 62, 64 which abut the bottom of the recesses 38, 40.

To dismount the component, it is necessary to use, according to the invention, a key 76 such as that shown in FIG. 2. The key consists of a flat blade bent at right angles, one branch 78 of which constituting a gripping portion and the other branch of which being divided into two parallel flat arms 80, 82 located in a same plane and having each a cross-section substantially equal to the cross-section of the passages defined between the grooves 42, 44 and the wall 16. The distance between the arms is equal to that between the grooves, whereby the arms can be introduced within the grooves and can slide therein until they abut against the ends of the lower clips 34, 36 which protrude into the grooves.

As shown in FIG. 8, the free ends of the arms are cut so as to have an inclined edge 84 which is inclined downwards and towards the median plane of the key, at the same angle as the beveled face 72 of the lower clips. The inclined edge 84 has a length L which is greater than the length 1 of the beveled edge 72 and is such that the horizontal projection of the difference L–1 is equal to the distance e between the axes of the stud 64 and of the corresponding hole 68. The inclined edge 84 is followed by a horizontal edge 86 parallel to the lower face 70 of clip 36.

The dismounting of the component will be now explained with reference to FIGS. 5 to 12. Holding the key by its gripping portion 78, the two arms 80, 82 are inserted in the grooves 42, 44. In the course of this movement, the inclined edges 84 of the arms come in abutment against the beveled faces 72 of the lower clips 34, 36 and act on them as cam surfaces. As the key is further pushed, the clips slide along the inclined edges 84 and are laterally bent one towards the other under the effect of the horizontal component $F_1$ of the force F exerted on them, until the lower faces 70 of the clips come into contact with the horizontal edges 86 of the arms of the key. At this moment, the studs 62, 64 are located exactly in front of the holes 66, 68 and the lower clips are in contact with the central stop 74. Under the effect of the vertical force exerted via the horizontal edges 86, the studs penetrate into the corresponding holes and the clips 34, 36 can be retracted into the recesses 38, 40.

The lower clips 34, 36 having been thus retracted, as shown in FIG. 9, the component is tilted using the key 76 which is held in its pushed position. The component is then brought in the position shown in FIG. 10 in which the stops 46, 48 located beneath the lower clips can be passed over the lower edge of the orifice 18. Then, while simultaneously lowering the component, the stops are brought into contact with the edge of the orifice, whereby the stop 26 of the upper clip 22 can be positioned at the same level as the upper edge of the orifice 18. The component is then in the position shown in FIG. 11. Finally, by tilting the component in the opposite direction, the upper clip 22 is completely released from the orifice. Since the key is still in its pushed position, the lower clips 34,36 are maintained close together, whereby the lateral stops 54, 56 can freely pass through the orifice. The component is then removed.

The invention provides therefore a system for fastening an elevator electrical component to a supporting wall, the system being completely invisible from the outside and therefore does not alter the aesthetic appearance of the face of the front plate. This fastening system is only accessible to authorized person by means of a very simple and therefore inexpensive key. Several details of the described embodiment can be modified. For instance, the housing can be equipped with a single lower clip. In this case, the key 76 comprises a single arm. Furthermore, the positions of the studs 62, 64 and of the holes 66, 68 can be inverted, i.e. the studs can be formed on the lower face of the housing, and the holes on the lower clips 34, 36.

Various changes to the above description may be made without departing from the spirit and scope of the present invention as would be obvious to one of ordinary skill in the art of the present invention.

We claim:

1. A vandal and theft resistant elevator electrical component, said elevator component covering, fitting within and approximating the size of an opening in an elevator cab or landing, said component comprising:

a face plate, a housing attached to said face plate, a flexible arm attached to and integral with said housing, said arm causing said housing to interfere with said opening upon removal of said housing from said opening, said arm being movable in a first direction and a second direction to avoid interference with said opening upon removal of said housing from said opening, a visually inconspicuous accessway in said face plate for allowing access to said arm, and a key for extending through said accessway and simultaneously moving said arm in said first and said second directions to allow said component to be removed from said opening without interference by said arm.

2. The component of claim 1 further comprising:

means for preventing said arm from not interfering with said opening if said arm is moved only in said first direction or only in said second direction.

3. The component of claim 2 wherein said means for preventing comprises:

an obstruction for blocking motion of said arm if said arm is only moved in one direction, and means for avoiding said obstruction if said arm is moved in two directions.

4. The component of claim 1 further comprising:

said arm being integral with a first side of said housing, a protrusion extending from a second side of said housing, said protrusion interfering with the insertion and removal of said component if said component is not moved in more than one direction while being inserted or removed.

5. The component of claim 1 further comprising:

said arm being integral with a first side of said housing, said arm having a protrusion extending beyond a second side of said housing to prevent removal of said component if said arm is not moved in two directions.

6. A vandal and theft resistant elevator electrical component, said elevator component covering, fitting within and approximating the size of an opening in an elevator cab or landing, said component comprising:

a face plate, a housing attached to said face plate, a flexible arm attached to and integral with said housing, said arm causing said housing to interfere with said opening upon removal of said housing from said opening, said arm not interfering with said opening if simultaneously moved in a first direction and in a second direction thereby enabling removal of said housing from said opening, and a visually inconspicuous accessway in said face plate for allowing access to said arm.

7. The component of claim 6 further comprising:

means for preventing said arm from not interfering with said opening if said arm is moved only in said first direction or only in said second direction.

8. A vandal and theft resistant elevator electrical component, said elevator component covering, fitting within and approximating the size of an opening in an elevator cab or landing, said component comprising:

a face plate, a housing attached to said face plate, a first flexible arm attached to and integral with said housing, said first arm causing said housing to interfere with said opening upon removal of said housing from said opening, said arm being movable in a first direction and a second direction to avoid interference with said opening upon removal of said housing from said opening, a second flexible arm attached to and integral with said housing, said second arm causing said housing to interfere with said opening upon removal of said housing from said opening, said arm being movable in a third direction and a fourth direction to avoid interference with said opening upon removal of said housing from said opening, a visually inconspicuous accessway in said face plate for allowing access to said first and second arms, and a key for extending through said accessway and simultaneously moving said first arm in said first and said second directions and said second arm in said second and third directions to allow said component to be removed from said opening without interference by said first and second arms.

9. The component of claim 8 further comprising:

means for preventing said first and second arms from not interfering with said opening if said first arm is moved only in said first direction or only in said second direction or if said second arm is moved only in said third direction or only in said fourth direction.

10. The component of claim 8 wherein said means for preventing comprises:

an obstruction for blocking motion of said first arm or said second arm if said first arm or said second arm is only moved in one direction, and means for avoiding said obstruction if said first arm and/or said second arm is moved in two directions.

11. The component of claim 8, said component further comprising:

said third direction and said second direction are equal.

12. The component of claim 8 further comprising:

said first arm and said second arm being integral with a first side of said housing, a protrusion extending from a second side of said housing, said protrusion interfering with the insertion and removal of said component if said component is not moved in more than one direction while being inserted or removed.

13. The component of claim 8 further comprising:

at least one of said first arms being integral with a first side of said housing, said arm having a protrusion extending beyond a second side of said housing to prevent removal of said component if said arm is not moved in two directions.

* * * * *